Nov. 29, 1927.
A. WEILAND
VEHICLE BUMPER
Filed May 5, 1926
1,651,008
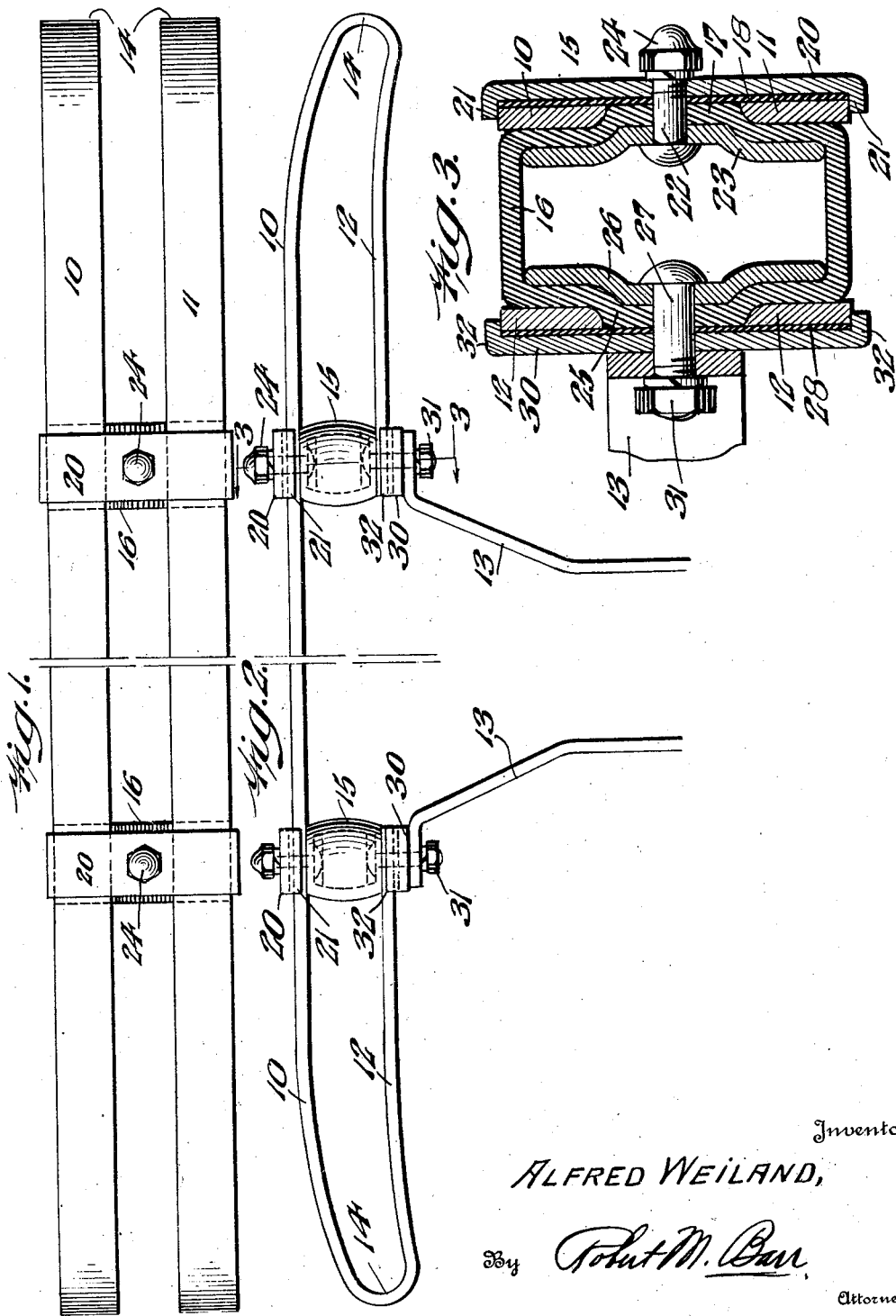
Inventor
ALFRED WEILAND,
By Robert M. Barr
Attorney Patented Nov. 29, 1927.

1,651,008

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER.

Application filed May 5, 1926. Serial No. 106,870.

The present invention relates to vehicle bumpers and more particularly to a combined spring metal and fabric shock absorbing bumper.

Some of the objects of the present invention are to provide an improved bumper construction for vehicles; to provide a simple, effective bumper which is inexpensive to manufacture; to provide a bumper embodying means to prevent the resilient steel parts thereof from bending beyond the limit of elasticity while increasing the shock absorbing properties of the bumper; to provide a bumper construction wherein rattling of loose metal to metal connections is impossible; to provide a bumper which automatically proportions its shock absorbing resistance in accordance with the magnitude of the force of impact; and to provide other improvements as will hereinafter appear.

In the accompanying drawings Fig. 1 represents a front elevation of a bumper embodying one form of the present invention; Fig. 2 represents a plan of the same; and Fig. 3 represents a section on line 3—3 of Fig. 2.

Referring to the drawings, one form of the present invention consists of a pair of impact bars 10 and 11 arranged in parallel spaced edge to edge relation and each having its ends 12 reversely bent to return substantially parallel to its body part to join brackets 13 forming supports from the vehicle. As here shown, the aforesaid bends are formed by giving the bars 10 and 11 a U-shape 14 and the two impact bars 10 and 11 preferably curve rearwardly as they approach the reverse bends in order to present an impact face directed to more advantageously ward off a blow coming angularly from the side.

For the purpose of supporting the impact bars 10 and 11 intermediate their ends, increasing the resistance thereof to shocks without lessening the shock absorbing properties of the bumper, and generally augmenting the deadening characteristics of the bumper to impacts, two cushioning elements 15 are interposed between the impact bars 10 and 11 and the ends 12 at points suitably spaced to most effectively absorb the distributed shock. Each of these cushioning elements 15 consists of a resilient body 16 of rubber, rubberized fabric or any other suitable material which is preferably molded in hollow form and generally has a medium molded therein under pressure. The impact bar receiving face of this body 16 is provided with a forwardly disposed boss 17 to form seats on opposite sides thereof for the respective bars 10 and 11 so that a flush surface is provided to receive a fabric liner 18 against which fits a clamping plate 20. This plate 20 has inturned end flanges 21 to hold the impact bars 10 and 11 against vertical displacement and a clamping bolt 22 projects through the aforesaid parts from an inner anchoring plate 23 which is molded into the body 16 and conforms to the contour of its inner front wall. A nut 24 clamps the parts together.

The rear side of the body 16 is likewise provided with a centrally disposed boss 25 to form upper and lower seats for the ends 12 and a similar fastening construction is used consisting of an inner anchoring plate 26 molded into the body 16 and having a bolt 27 passing through the boss 25, a fabric liner or spacer 28, an outer clamping plate 30, and the bracket 13. A nut 31 clamps the parts together while inturned flanges 32 hold the superposed ends 12 against vertical displacement.

In operation the natural rigidity of the molded bodies 16 holds the impact bars 10 and 11 in proper impact receiving position while sagging is also resisted by the edgewise relation of the impact bars. Thus a light blow upon the bars 10 and 11 at any point is taken up by the spring material with very little direct absorption by the cushioning elements 15, but a blow of any considerable force in addition to being lessened by the bars 10 and 11 is transmitted to the flexible bodies 16 and these latter under compression expand laterally to break the blow or so lessen it that the brackets 13 transmit little or none of it to the vehicle. The theory of action is to provide a bumper which automatically compensates in accordance with the impact force applied; that is, when a light blow is received the bars react to deaden the blow at once while as heavier and heavier impacts are received more and more of the shock resisting elements of the structure are brought into play and give deadening effect proportioned to each force increase.

Having thus described my invention, I claim:

1. A bumper construction comprising an impact bar having reversely turned ends, cushioning elements of rubber or rubberized fabric interposed respectively between said ends and said bar to connect said ends and bar, and means to attach said ends to a vehicle frame.

2. A bumper construction comprising two impact bars having reversely turned ends respectively, cushioning elements of rubber or rubberized fabric interposed respectively between the pairs of ends and said bars, and means to attach said ends to a vehicle frame.

3. A bumper construction comprising two impact bars having reversely turned ends respectively, hollow resilient elements of molded rubber or rubberized fabric connected at one side to said impact bars and at the opposite side to said ends, fastening devices for respectively connecting said sides to said bars and said ends, and means for attaching said ends to a vehicle frame.

4. A bumper construction comprising two impact bars having reversely turned ends respectively, hollow resilient elements of molded rubber or rubberized fabric connected at one side to said impact bars and at the opposite side to said ends, fastening devices for respectively connecting said sides to said bars and said ends, means for attaching said ends to a vehicle frame, and means to prevent metal to metal contact between said fastening devices and said bars and ends.

Signed at Philadelphia, county of Philadelphia, State of Pennsylvania, this 3rd day of May, 1926.

ALFRED WEILAND.